(12) United States Patent
Borg et al.

(10) Patent No.: US 6,213,653 B1
(45) Date of Patent: Apr. 10, 2001

(54) METHOD AND APPARATUS FOR EFFICIENTLY INTERPOLATING AN IMAGE USING AN EXPANSION FACTOR DERIVED FROM TWO DIFFERENT NUMBERS OF GRAY LEVELS

(75) Inventors: Lars U. Borg, Saratoga; Shankar J. Iyer, Fremont, both of CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 08/598,884

(22) Filed: Feb. 9, 1996

(51) Int. Cl.$^7$ .................................................. G06T 11/00
(52) U.S. Cl. ............................................................ 395/129
(58) Field of Search ...................................... 395/126–132, 395/133, 139, 141, 171, 172; 358/445

(56) References Cited

U.S. PATENT DOCUMENTS

| | | | |
|---|---|---|---|
| 5,274,471 | * 12/1993 | Kim | 358/455 |
| 5,293,254 | 3/1994 | Eschbach | 358/445 |

OTHER PUBLICATIONS

Heckbert, Paul S., "Tri–Linear Interpolation," *Graphics Gems IV*, 1994 Academic Press, Inc., pp. 521.

* cited by examiner

*Primary Examiner*—Almis R. Jankus
(74) *Attorney, Agent, or Firm*—Fish & Richardson P.C.

(57) ABSTRACT

A method and apparatus for determining an efficient expansion factor for an interpolation process to produce an interpolated image that has a greater spatial resolution and greater number of gray levels than an original image. An original image having a resolution is received by a computer system and an expansion factor for the image is determined. The expansion factor is derived from a number of gray levels displayable on a target display device and a number of gray levels that can be represented in an interpolated image produced from the original image. This expansion factor is close to the largest expansion factor that will allow the target display device to display all of the interpolated gray levels, and is used to provide an interpolated image having high visual quality and minimal memory requirements. The original image is interpolated using the expansion factor and is preferably supplied to the target display device, such as a display screen or a printing device.

40 Claims, 8 Drawing Sheets

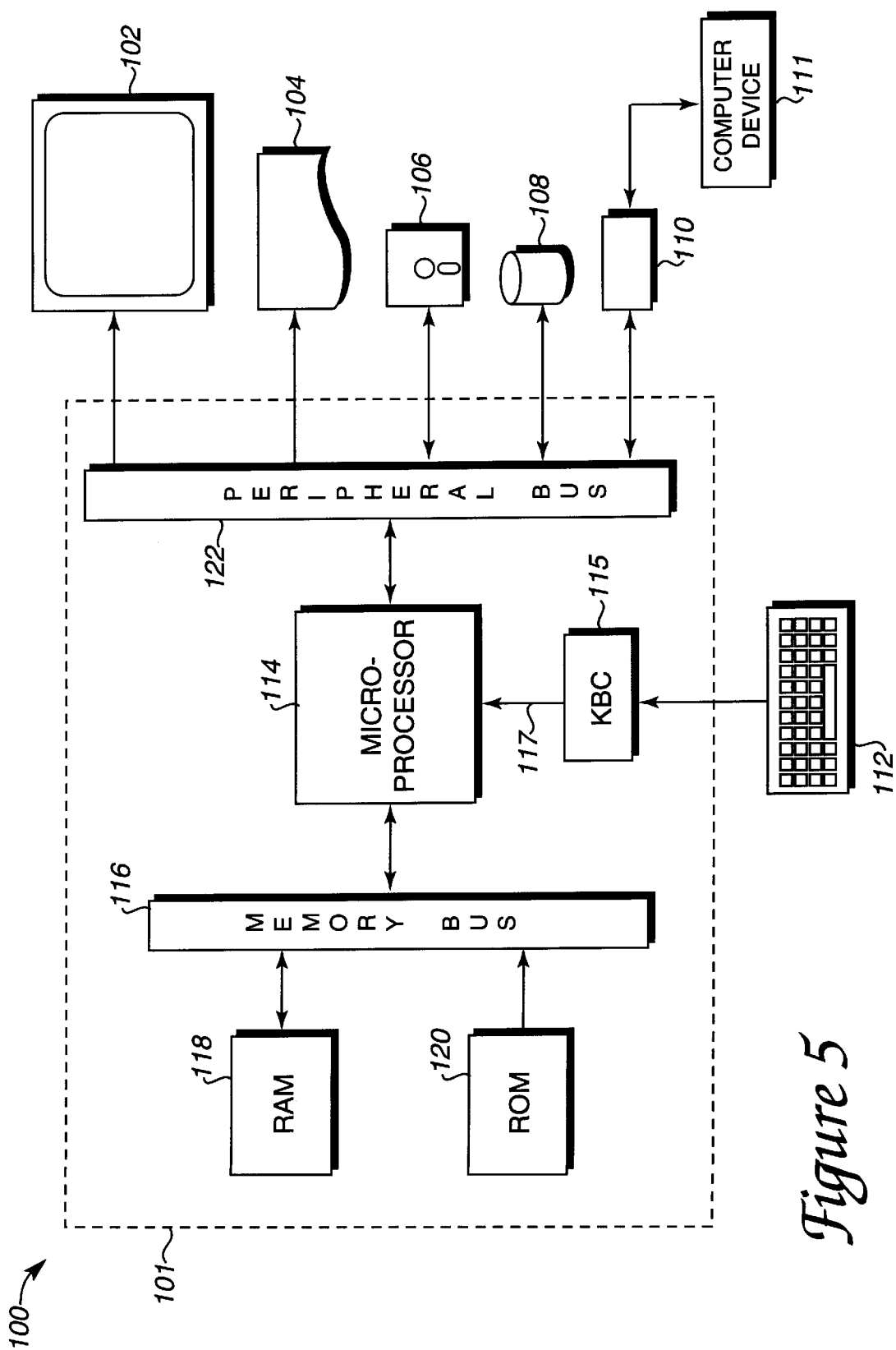

METHOD AND APPARATUS FOR EFFICIENTLY INTERPOLATING AN IMAGE USING AN EXPANSION FACTOR DERIVED FROM TWO DIFFERENT NUMBERS OF GRAY LEVELS

BACKGROUND OF THE INVENTION

The present invention relates generally to the display of data by output devices, and more particularly to a method and apparatus for interpolating a higher resolution image from a lower resolution image to create a higher displayed visual quality of the image.

A computer system can output data to a wide variety of output display devices. Output display devices such as laser printers, plotters, and other printing devices produce an image on a sheet of paper or other physical surface or media, while output display devices such as computer monitors and flat-panel display devices develop visual representations on a computer screen.

Many output display devices receive display data in the form of a "bitmap" or "pixel map" and generate images from the display data. A pixel is a fundamental picture element of an image generated by an output display device, and a bitmap is a data structure including information concerning a number of pixels of the representation. Bitmaps that contain more than on/off information, such as color values, are often referred to as "pixel maps." As used herein, both bitmaps and pixel maps are referred to as "bitmaps." For example, a printer can print dots on a piece of paper corresponding to the information of a bitmap. Alternatively, a computer monitor can illuminate pixels based upon the information of the bitmap. The term "image" is used interchangeably with the term "bitmap" to refer to both the data that is provided to an output display device as well as the actual outputted visual representation displayed by the display device. A "raster" output device creates a visual representation by displaying the array of pixels arranged in rows and columns from the bitmap. Most output devices, other than plotters, are raster output devices.

Images are typically displayed with a number of different shades or colors assigned to each of the pixels of the image. Herein, the term "gray level" is used to refer to the particular shade, color, and/or brightness of a pixel. For example, an output display device that can display 256 "gray levels" might display 256 shades of gray, or, alternatively, 256 different colors or shades of colors. Many examples herein refer to gray levels between the extreme gray levels of black (or dark) at one end of the scale and white (or light) at the opposing end of the scale. The intermediate gray levels between these extremes are displayed as shades of gray or as different colors such as red, yellow, blue, etc., or shades of different colors. Images are also specified with a resolution. There are two types of resolution referred to herein: spatial resolution and "gray level" (or "tonal") resolution. Spatial resolution refers to the number of pixels per unit dimension in an image, and is often expressed as dots per inch (dpi) or pixels per inch. Gray level resolution refers to the amount of different gray levels that can be displayed in an image; the greater the number of gray levels that can be displayed, the greater the gray level resolution.

Images can be specified with a bitmap depth or pixel depth, i.e., as an "n-bit" bitmap or "n-bit" image, which signifies how many gray levels can (potentially) be displayed in the image. The number of gray levels displayed is equal to $2^n$; for example, a 2-bit image allows the the output device to display 4 gray levels, a 4-bit image allows the output device to display 16 gray levels, etc. Some output display devices can display an individual pixel at one of multiple available gray levels. For example, a display device with pixel depth of 4 bits can display a pixel in one of 16 different available gray levels, while an 8-bit display device can display a pixel in one of 256 available gray levels. For instance, continuous tone ("contone") output devices typically display 256 gray levels; sometimes, a 16 gray-level device is called a contone device. Other output display devices may only be able to display a pixel in one of 2 available gray levels, e.g., black or white. These "bi-level" or "halftone" display devices include some laser printers, ink jet printers, other black and white printers, monochrome monitors, image setters, color output devices having bi-level output for each color component, etc.

Output display devices also typically are able to display additional gray levels by adjusting the spatial density of pixels in "pixel clusters" (also called "halftone cells"). This process of displaying additional gray levels is known as "dithering" or "halftoning." Dithering typically maps the pixels in the original image to available gray levels on the device. A pixel cluster is a group of one or more pixels that is repeated across an area to provide a simulated gray level, where at least two pixels in the pixel cluster are at different gray levels. For example, in a bi-level scheme having two gray levels, some of the pixels of the pixel cluster are displayed as black (dark), while other pixels in the cluster are white (light). By adjusting the number of pixels in the cluster that are black and white, different gray levels can be simulated (typically, contone devices do not use dithering). If the spatial resolution of the clusters is high enough, then a viewer will see the cluster as a shade of gray. For example, a circular dot pattern in each pixel cluster is commonly used in print devices, where the dot is made larger or smaller for each gray level to be represented. Or, a checkerboard pattern of black and white pixels can be used, where black and white pixels are alternated in the pixel cluster such that no pixel is adjacent to a pixel having the same gray level within the cluster. These patterns are often used to provide an intermediate gray level between extreme black and white gray levels. The number of black pixels in the cluster can be increased to create a darker gray level, and the number of white pixels can be increased to create a lighter gray level.

An image often may be of poor visual quality. For example, an image may have a low spatial resolution, where the pixels of the image are relatively large and can be noticed by a human viewer of the image as "jagged" edges on lines and objects rather than as smooth edges. An image also may have a low gray level resolution, i.e., the image may only include a small number of gray levels and/or the output device may only be able to display a small number of gray levels. The viewer can thus notice undesired large transitions or contours between different pixel gray levels where a smooth transition of gray levels (i.e., a "blend") may be desired.

An image may often be processed to increase the visual quality of the image. Image interpolation is one method by which the visual quality of an image can be increased. FIG. 1 is a block diagram of a standard image interpolation process 10. An original image 12 is input to an interpolation processor 14 implemented on a computer system. The interpolation processor 14 determines the resolution of the original image and the resolution of a primary target display device 16 which is to be used to display the image. An expansion factor 18 (or scale factor) is determined which is the multiplier by which the spatial resolution of the original image will be increased (if necessary) when displaying the image. The interpolation processor 14 applies the expansion factor in an interpolation process which produces an interpolated image 20. The interpolated image is then provided to the target display device 16 to be displayed, or the interpolated image can be stored, processed, sent to a different display device, or otherwise manipulated. The interpolated image 20 is usually of higher spatial resolution and may, in some cases, also be of higher gray level resolution than the original image, and thus is generally of higher visual quality than the original image, i.e., the interpolated image looks "smoother" in both shape and color and is more realistic.

The process of interpolation is illustrated in greater detail with respect to FIGS. 2a and 2b. FIG. 2a shows a pictorial representation of two adjacent pixels 22 and 24 which are included in original image 12 and which are shown as they would be displayed on a display device along an x-axis 23 and a y-axis 21. Pixels 22 and 24 have only two gray levels: black (or dark) and white (or light), where pixel 22 is a black pixel, and pixel 24 is a white pixel. The centers 26 of the pixels are also shown, since interpolation is often performed with reference to the pixel centers.

FIG. 2b is a graph 28 showing the brightness level (i.e., gray level) of pixels 22 and 24 of FIG. 2a. The vertical axis B represents the brightness level of the pixels, where a level of 1 indicates black and a level of 0 indicates white (these values can designate other gray levels in different embodiments). The x-axis 23 is provided to delineate the x spatial dimension of the pixels over which the original image is to be interpolated. Graph function 30 is provided at a brightness of one since it corresponds to black pixel 22, and graph function 32 is at a brightness of zero since it corresponds to the white pixel 24.

FIGS. 3a and 3b represent an interpolated image derived from the original image pixels 22 and 24 of FIGS. 2a and 2b. FIG. 3a shows a graph 34 similar to graph 28, in which the brightness for the interpolated pixels is represented on the vertical axis and the x-axis is the horizontal axis. FIG. 3b shows the x-y planar view of the interpolated pixels as displayed. An expansion factor of 3 has been applied to the pixels 22 and 24 to create an interpolated image having three times the resolution of the original image. The pixels have been interpolated in the x-dimension only. The area 36 between the centers 26 of the interpolated pixels is preferably processed with respect to pixel pair 22 and 24. This area 36 now has a total of four gray levels, represented as the levels of 0, ⅓, ⅔, and 1. An expansion factor of X creates X-1 intermediate gray levels. These gray level values are evenly distributed between the brightness values of the two original pixels (0 and 1). Thus, an interpolated pixel 38 having ⅓ the width of the original pixel 22 is centered around pixel center 26 a, having a graph function 40 at the brightness level of 1. A similar interpolated pixel 42 is centered around pixel center 26b and has a graph function 44 at a brightness level of 0. Interpolated pixel 46 has a brightness value of ⅔ as shown by graph function 48 and is positioned from pixel 38 to the midline 47 between the original pixels. Interpolated pixel 50 has a brightness value of ⅓ as shown by graph line 52 and is positioned between pixel 46 and pixel 42.

The brightness level of pixels 54 outside the area between the centers of the pixels 22 and 24 are determined by the interpolated values between the centers of one of the original pixels 22 and 24 and an adjacent pixel (not shown). For example, if an original pixel (not shown) positioned adjacent and to the left of original pixel 22 has a brightness level of zero (white), then pixel 54a might have a brightness level of ⅔, as shown by dotted graph function 56. A brightness value can be similarly determined for pixel 54b. If there are no pixels adjacent to an original pixel in a particular direction, then the pixels 54a and 54b can be provided with a default gray level (brightness level), such as the brightness of the appropriate original pixel 22 or 24.

FIGS. 4a and 4b are diagrammatic illustrations of an example of two-dimensional (or "bilinear") interpolation. Original pixels 58, 60, 62, and 64 have been interpolated by an expansion factor of 3 in both x- and y-dimensions between the centers 26 of the pixels, resulting in an image resolution three times greater than the original resolution in both dimensions. Interpolated pixels 66 centered on pixel centers 26 have a brightness level equal to the brightness level of the original pixels. Intermediate Pixels 68 have intermediate brightness values as determined by the brightness values of the pixels surrounding the intermediate pixels. For example, the gray levels of edge intermediate pixels 70 are preferably determined first as described with reference to FIGS. 3a and 3b. The gray levels of interior intermediate pixels 72 are then preferably determined in either an x- or y-direction. For example, intermediate pixels 72a and 72b have intermediate gray levels between the brightness values of edge pixels 70a and 70b, determined in an x-direction. The gray levels of pixels 74 outside the area between the centers of the pixels are determined from the appropriate adjacent pixels (not shown).

A problem with image interpolation is that interpolated images can become exceedingly large in terms of required storage space so as to become inefficient to store and manipulate. The magnitude of the expansion factor determines how large the interpolated image is, where too high of an expansion factor causes the interpolated image to exceed available or desired memory space. For example, assume an original image includes 2 gray levels of 0 and 1. An expansion factor of X will create X−1 interpolated pixels for each original pixel, and create X−1 gray levels, for a total of X+1 gray levels in the interpolated image. For example, an expansion factor of 255 creates 254 interpolated pixels per original pixel and a total of 256 gray levels. The interpolated image has a new spatial resolution that is increased over the original resolution by a factor of $X^2$, e.g., 255×255=65,025 (in number of pixels). The greater spatial resolution (and gray levels resolution, if it has increased) consume a much larger amount of memory space, and may exceed the available or desired amount of memory space.

In addition, too high of an expansion factor may provide more gray levels than can be displayed by a particular output display device. For example, using dithering, a 300 dpi bi-level output display device may be able to display 25 gray levels. If an interpolation process expands the number of gray levels in an image to be greater than 25, then some of the gray levels will not be displayed on the output device. This can cause an uneven distribution of gray levels in the image that affects the quality of the image.

These problems have been addressed in the prior art by limiting the expansion factor for interpolated images by various methods. One method is to limit the spatial resolution of the interpolated image 20 to the maximum possible spatial resolution of the target display device. For example, if the target display device displays a maximum resolution D of 600 dots per inch, and the original image resolution I is 10 pixels per inch, then the expansion factor is provided with a maximum limit of D/I=600/10=60. This first method can be employed separately for each dimension of the interpolated image. Another method used in the prior art is to limit the gray level resolution of the interpolated image to the maximum possible gray level resolution of the target display device. For example, PostScript devices are typically limited to a maximum of 8-bit output or 256 gray levels (e.g., using dithering), and the expansion factor can be limited such that the interpolated image includes no more than 256 gray levels. A third method limits the expansion factor by calculating twice the screen ruling of the target display device divided by the original image resolution. The "screen ruling" or "halftone frequency" is a measure of resolution for half-tone output display devices, also known as a half-tone frequency. This third rule is a "rule of thumb" used in the printing industry when scanning images for later printing on a press. Previous methods may also use a combination of all these methods to limit the expansion factor.

Problems are inherent when using the prior art methods of limiting an expansion factor and the resolution of the interpolated image. The first two methods of the prior art, limiting the spatial resolution of the interpolated image and limiting the gray level resolution to a known maximum, may still produce unnecessarily high expansion factors, making the resulting image consume more memory space than is necessary. These larger-than-necessary images can also cause inefficiencies such as longer print and transfer times in subsequent subsystems which process or display the image. The third (approximate) method of the prior art, limiting by screen ruling or another similar rule of thumb, may similarly provide an inefficient interpolated image size and also is not effective for display devices that do not use traditional screens with screen rulings, such as printers with stochastic screening. The third method of using a rule of thumb factor may also provide too low an expansion factor so that the interpolated image does not utilize all the available spatial or gray level resolution of the target display device, resulting in a displayed image having poor visual quality.

SUMMARY OF THE INVENTION

The present invention provides a method and apparatus for determining an expansion factor for an interpolation process. The expansion factor is determined in view of both the number of gray levels that a target display device can display and the number of additional gray levels that can be achieved via interpolation, thus providing an interpolated image having high visual quality and low memory requirements.

More specifically, the method of the present invention provides a method for producing an interpolated image from an original image including a step of receiving on a computer system an original image having a specific resolution and determining an expansion factor for the image. The expansion factor is derived in view of both the number of gray levels displayable on a target display device, and the number of gray levels that can be represented in possible interpolated images by interpolating the original image. The original image is interpolated utilizing this expansion factor to produce an interpolated image that has a greater spatial resolution than the original image and a greater number of gray levels than the original image. The resolution of the original image is multiplied by the expansion factor to determine a spatial resolution of the interpolated image, and the interpolated pixels are filled with intermediate gray levels. The interpolation can be performed in one or more dimensions of the original image.

Preferably, a ratio between the target display device resolution and the resolution of the original image is determined. The number of gray levels displayable on the target display device is expressed as a first relationship between the number of gray levels displayed and the size of a pixel cluster (in device pixels) displayed by the target display device. The number of gray levels in the interpolated image is the expansion factor +1, and is expressed as a second relationship between the number of gray levels in a particular interpolated image (i.e., achieved through interpolation) and the size of an interpolated image pixel expressed in units of target device pixels. The ratio of target display device resolution and original image resolution, as well as interpolated image pixel size, are preferably used to help determine the second relationship. The expansion factor is determined by finding an intersection between the first and second relationships. This expansion factor is equal or close to the largest expansion factor that will allow the target display device to display all of the interpolated gray levels.

An analytical method and a numerical method are described for finding the intersection of the two relationships to determine the expansion factor. The analytical method includes setting the first and second relationships equal to each other to find the intersection point, and determining the expansion factor from the number of gray levels at the intersection point. The numerical method includes determining multiple expansion factors from a look-up table of values representing the first relationship and using a second relationship similarly to the analytical method. An expansion factor is selected from the multiple expansion factors which is the smallest expansion factor of those expansion factors which are larger than the number of gray levels that the output display device can represent at the pixel cluster size which corresponds to the selected expansion factor. The selected expansion factor is used to create the interpolated image.

The expansion factor resulting from the intersection of the first and second relationships is preferably a preliminary expansion factor, and further limits are applied to the preliminary expansion factor to determine an actual expansion factor which is used in the interpolating step. The additional limits include the maximum number of gray levels that can be represented by the bits in the interpolated image (e.g., 256 for 8 bits) and the ratio of the target device resolution to the original image resolution. Also, the expansion factor is preferably adjusted to an odd number to minimize aliasing in the interpolated image.

The interpolated image is preferably supplied to an output display device, such as a display screen or a printing device. The output display device is preferably the target display device having the spatial resolution used in determining the expansion factor. The output display device can be a bi-level (halftone) or multi-level display device capable of displaying multiple gray levels per pixel.

A computer system for producing an interpolated image from an original image includes a processor, read/write memory, and the target display device for displaying images. Mechanisms are included for receiving an original image, for determining an expansion factor for the original image which is derived from a number of gray levels displayable on a target display device and a number of gray levels in possible interpolated images that can be produced from the original image, and for interpolating the original image utilizing the expansion factor to produce an interpolated image.

An advantage of the present invention is that an expansion factor is precisely determined and optimized for interpolating an image having high visual quality and efficient storage requirements. The expansion factor is determined in view of both the limits of the number of gray levels that a target display device can display and the number of gray levels that can be represented in an interpolated image. This allows all the gray levels that can be displayed by a target display device to be included in an interpolated image without unnecessarily wasting memory space for storing gray level data that is not displayed.

These and other advantages of the present invention will become apparent to those skilled in the art upon a reading of the following specification of the invention and a study of the several figures of the drawing.

BRIEF DESCRIPTION OF THE DRAWINGS

FIG. 2b is a graph showing the brightness levels of the pixels of FIG. 2a;

FIG. 3a is a graph showing the brightness levels of interpolated pixels in an interpolated image derived from the pixels of FIG. 2a;

FIG. 5 is a block diagram of a computer system suitable for receiving, interpolating and displaying images in accordance with the present invention;

DETAILED DESCRIPTION OF THE PREFERRED EMBODIMENT

Figure 1:
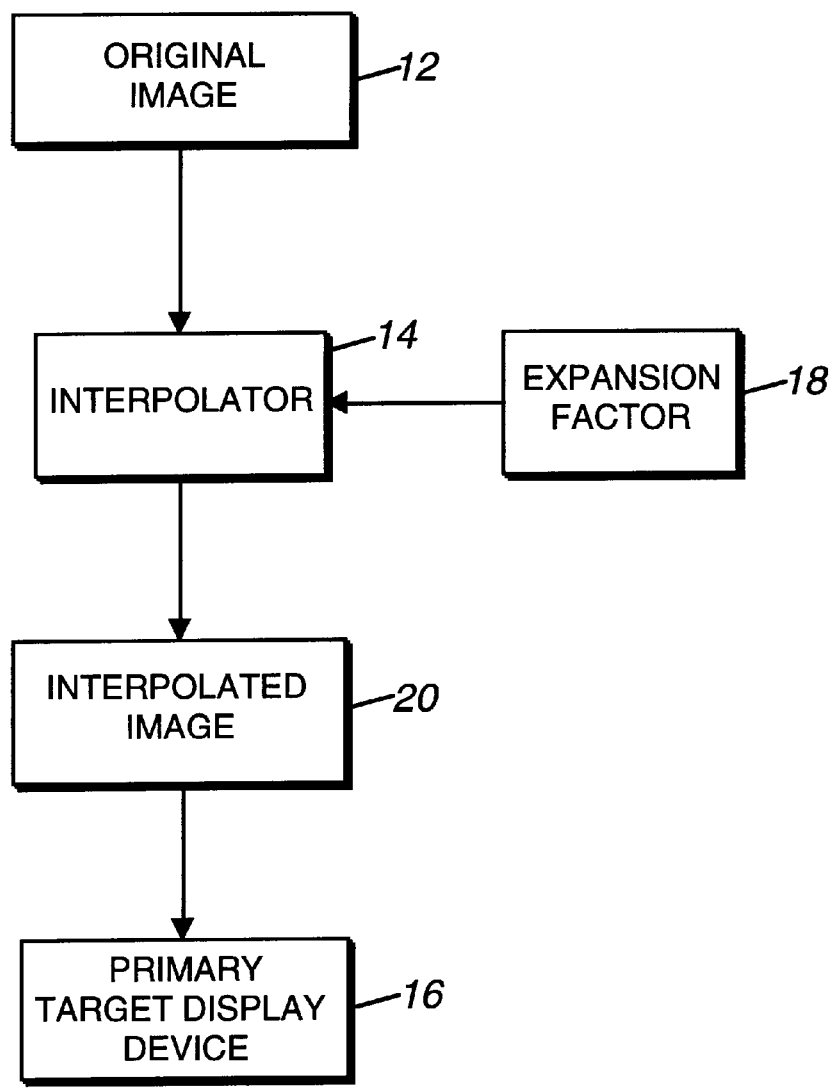
FIG. 1 is a block diagram of a prior art interpolation process.
Figure 2A:
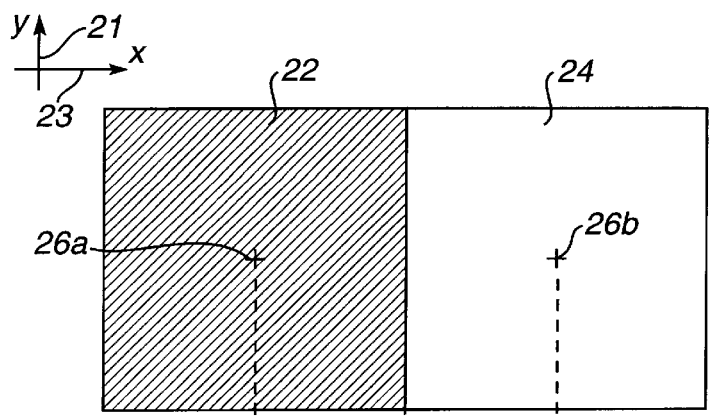
FIG. 2a is a diagrammatic illustration of original image pixels.
Figure 2B:
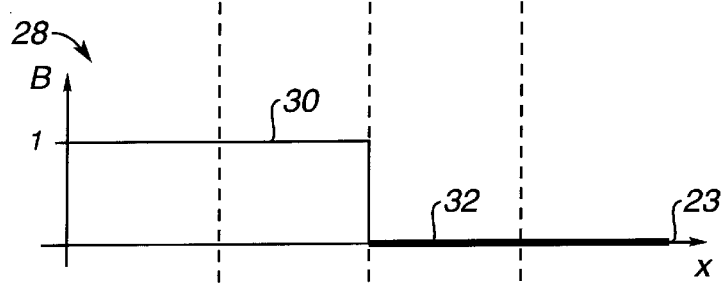
Figure 3A:
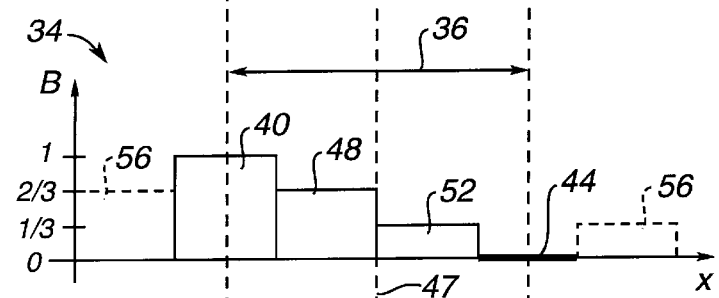
Figure 3B:
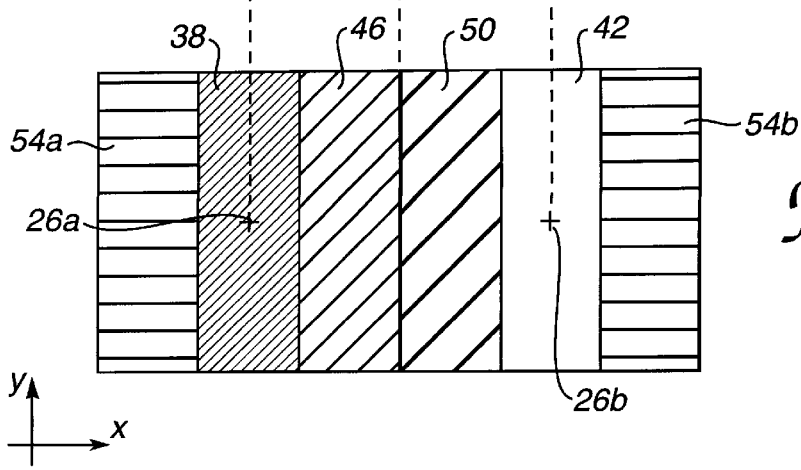
FIG. 3b is a diagrammatic illustration of interpolated image pixels that have been interpolated in one dimension.

The present invention is well-suited for limiting interpolation expansion factors to provide a high-quality, efficient interpolated image. However, the present invention can also be used to generally convert an original image into a higher resolution image.

A number of terms are used herein to describe images and related structures. "Pixel" refers to a single picture element of an image. Taken collectively, the pixels form the image. The term "image" is used both to describe the data structure that is processed by the computer system and provided to an output display device, as well as the visual representation that is displayed by the output display device and viewed by a user. Herein, the term "bitmap" can be used interchangeably with the term "image." The image data structure includes bits stored in digital memory in a data structure that represents the pixels. The image or bitmap data structure can include only black and white pixels, or the image (bitmap) can include a "pixel map" providing a greater gray level resolution, such as for color or gray scale displays. The term "gray level" refers to a particular shade, gray shade, color, and/or brightness of a pixel. For example, an output display device that can display 256 "gray levels" might display 256 shades of gray, or 256 different shades of colors. "Spatial resolution" is the number of pixels per unit dimension in an image, and "gray level resolution" (also known as "tonal resolution") is the amount of different gray levels that can be displayed in an image. The term "interpolate" is generally used to mean creating an interpolated image having a greater spatial resolution and/or gray level resolution than an original image from which the interpolate image is derived. "Display" can refer to portraying images on a computer screen or the like, as well as on other media, such as printing images on paper. "Output display devices" include laser printers, plotters, computer displays, video displays, LCD displays, etc.

In FIG. 5, a computer system 100 suitable for interpolating an image and displaying the interpolated image can include a digital computer 101, a display screen 102, a printer 104, a floppy disk drive 106, a hard disk drive 108, a network interface 110, and a keyboard 112. Other types of peripherals can also be included, such as a CD-ROM drive, input tablet or other user interface devices, etc. Digital computer 101 typically includes a microprocessor 114, a memory bus 116, random access memory (RAM) 118, read only memory (ROM) 120, a peripheral bus 122, and a keyboard controller 124. Digital computer 101 can be a personal computer (such as an IBM-PC AT-compatible or Macintosh personal computer), a workstation (such as a SUN or Hewlett-Packard workstation), a controller embedded in a printing device, a raster image processor, etc.

Microprocessor 114 is a general purpose digital processor which controls the operation of computer system 100. Microprocessor 114 can be a single-chip processor or can be implemented with multiple components. Using instructions retrieved from memory, microprocessor 114 controls the reception and manipulation of input data and the output and display of data on display devices. In the described embodiment, a function of microprocessor 114 is to determine an expansion factor and interpolate an image from an original image. The use of program instructions to perform operations on a computer and microprocessor is well known to those skilled in the art. The program instructions can be stored on a "computer readable medium." Herein, such a medium includes by way of example memory such as RAM and ROM coupled to microprocessor 114, magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk drive or a component such as semiconductor memory.

Memory bus 116 is used by microprocessor 114 to access RAM 118 and ROM 120. RAM 118 is used by microprocessor 114 as a general storage area and as scratch-pad memory, and can also be used to store downloaded data that is being displayed (or not being displayed). ROM 120 can be used to store instructions followed by microprocessor 114 and other permanent data.

Peripheral bus 122 is used to access the input, output, and storage devices used by digital computer 101. In the described embodiment, these devices include display screen 102 printer device 104, floppy disk drive 106, hard disk drive 108, and network interface 110. Keyboard controller 115 is used to receive input from keyboard 112 and send decoded symbols for each pressed key to microprocessor 114 over bus 117.

Display screen 102 is an output display device that displays images of data provided by microprocessor 114 via peripheral bus 122 or provided by other components in the computer system. In the described embodiment, display screen 102 is a raster device which displays visual representations on a screen corresponding to bits of a bitmap (i.e., "image") in rows and columns of pixels, as is well known to those skilled in the art. That is, a bitmap can be input to the display screen 102 and the bits of the bitmap can be displayed as pixels. An input bitmap can be directly displayed on the display screen, or components of computer system 101 can first render codes or other image descriptions from a page description file into bitmaps and send those bitmaps to be displayed on display screen 102, as is also well known. Raster display screens such as CRT's, LCD displays, etc. are suitable for the present invention.

Printer device 104 is an output display device that provides a visual representation of a bitmap on a sheet of paper or a similar surface. Printer 104 can be a laser printer, which, like display screen 102, is a raster device that displays pixels derived from bitmaps. Printer device 104 can print visual representations derived from data such as found in a portable electronic document. Other output devices can be used as printer device 104, such as a plotter, typesetter, etc. Digital computer 101 can display visual representations on an output display device, such as display screen 102 or printer 104, using data from memory, a storage device, or from another source or host over a network connected by network interface 110. Other output display devices can also be used to display a visual representation, in either a temporary or permanent form, and may include projection devices, plotters, etc. Herein, the term "target display device" or the like is used typically to refer to either a display screen device 102 or a printer device 104.

Output display devices can include components to help display visual images. For example, printer device 104 can include buffer memory, a digital processor, memory such as RAM and ROM, etc. Some or all of the interpolation steps described herein can be implemented by an output display device in some embodiments. Printer devices and other display devices can read commands and data in a page description language, such as PostScript® from Adobe Systems, Inc. of Mountain View, Calif., and can interpret/ execute the commands to rasterize (render) a bitmap on a sheet of paper or viewing screen. PostScript has its own limitations for the number of gray levels that can be displayed by an output display device, as described in greater detail subsequently.

Floppy disk drive 106 and hard disk drive 108 can be used to store data such as a document or image that has been retrieved, downloaded or created for use by the present invention. Floppy disk drive 106 facilitates transporting such data to other computer systems, and hard disk drive 108 permits fast access to large amounts of stored data. Other mass storage units such as nonvolatile memory (e.g., flash memory), PC-data cards, or the like, can also be used to store data used by computer system 10. Herein, a "computer (or machine) readable storage medium" can refer to both memory such as RAM 118 and ROM 120 as well as disk drives 106 and 108 or any other type of device for storing data. The interpolated image of the present invention can be sent to other memory, storage or network devices instead of being sent to output display devices.

Network interface 110 is used to send and receive data over a network connected to one or more other computer systems, such as computer device 111. For example, an interface card, modem, or similar device and appropriate software implemented by microprocessor 114 can be used to connect computer system 100 to an existing network and transfer data according to standard protocols.

Keyboard 112 is used by a user to input commands and other instructions to computer system 100. Images displayed on display screen 102 or accessible to computer system 100 can be edited, searched, or otherwise manipulated by the user by inputting instructions on keyboard 112. Other types of user input devices can also be used in conjunction with the present invention. For example, pointing devices such as a computer mouse, a track ball, a stylus, and/or a tablet can be used to manipulate a pointer on a screen of a general-purpose computer.

Figure 6:
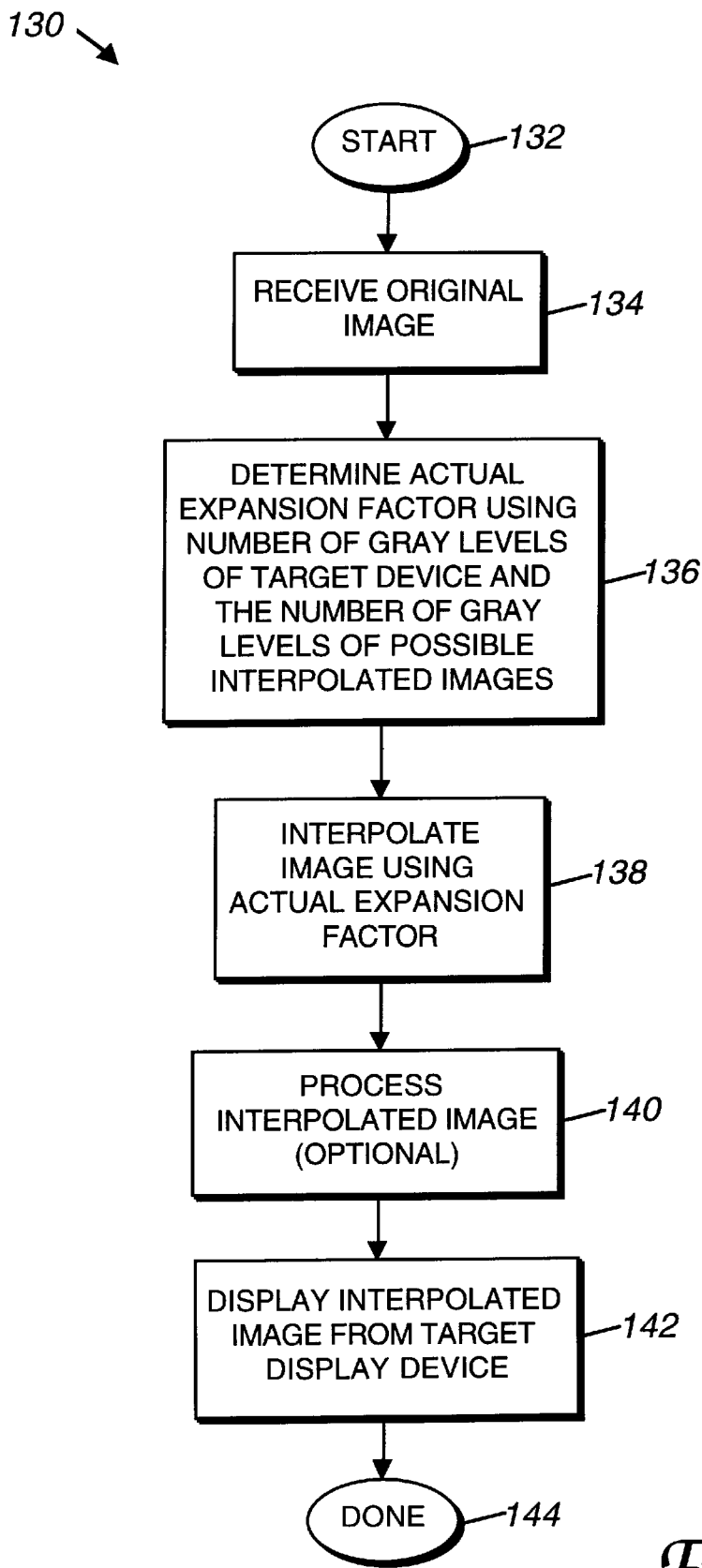
FIG. 6 is a flow diagram illustrating the process of interpolating an image according to the present invention.

FIG. 6 is a flow diagram illustrating the process 130 of interpolating an image according to the present invention. The process begins at 132. In step 134, an original image is generated, processed, received or retrieved by the computer system 100. The original image can be generated by software and/or hardware suited to create bitmap images, as is well known to those skilled in the art. Alternatively, the original image can be retrieved, for example, from a connected storage or memory device, from a different computer device 111 through network interface 110, a different transmission device, or a portable medium such as CDROM or floppy disk, or from a different process that manipulates the image. Thus, the term "receive" or "provide" is intended to refer to these and other ways for the microprocessor to be provided with an original image. The original image has a resolution typically expressed in pixels per unit measurement, such as inches. For example, images on a PhotoCD™ can be specified as 512×304 (x by y) pixels, where the resolution is determined by the area covered by the image when it is displayed. Alternatively, the resolution of the original image can be expressed in other ways, such as by the number of pixels in the image. In other embodiments, the computer system 100 can receive only the original image's resolution as a parameter or data value, rather than receiving the original image itself. Or, only a part of the original image might be received to determine a resolution of the entire original image.

In step 136, an actual expansion factor is determined according to the present invention using the number of gray levels of the target output display device and the number of gray levels in possible interpolated images for different sizes of device pixel clusters and interpolated image pixels. This step takes into account both the target display device gray level resolution as well as the gray level resolution of the interpolated image to achieve a more efficient expansion factor. The actual expansion factor is close to the largest expansion factor that will allow the target display device to display all of the interpolated gray levels. The process of step 136 is described in greater detail with respect to FIG. 7.

In step 138, the original image is interpolated to provide an interpolated image using the actual expansion factor determined in step 136. This step is performed by processes well known to those skilled in the art. Bilinear interpolation is a common method described in computer graphics texts such as *Graphics Gems IV*, edited by Paul S. Heckbert, Academic Press, 1994, which is incorporated by reference herein. This process usually includes increasing the spatial resolution of the original image in the interpolated image, and filling the new interpolated pixels with intermediate gray levels between each pair of original image pixels, where the interpolated intermediate gray levels are determined from the gray levels of the original pixels. Linear (one-dimensional) interpolation or bi-linear (two-dimensional) interpolation can be implemented. Alternatively, non-linear interpolation, such as cubic interpolation, can be provided in the present invention.

In optional step 140, the interpolated image can be processed by other methods and/or mechanisms to achieve a particular result. For example, the interpolated image can be provided to a different image processor to provide a higher quality image or a compressed image that can be stored in less memory space (if the interpolated image is to be stored). In step 142, the interpolated image is provided to the target display device, such as a printer or display screen, and is displayed by the target display device. Alternatively, the interpolated image can be provided to a different output display device or a different processor or other peripheral, or the interpolated image can be stored if desired. The process 130 is then complete at 144.

Steps 134, 136, 138, and 140 can be implemented on microprocessor 114. The target display device can be, for example, display screen 102 or printing device 104. Alternatively, different steps or parts of steps of process 130 can be performed on different computer systems or microprocessors. For example, the steps of receiving the original image and determining the expansion factor can be performed by one microprocessor, and the interpolation step can be performed by a different microprocessor in the same computer system 100 or a different computer system.

Figure 7:
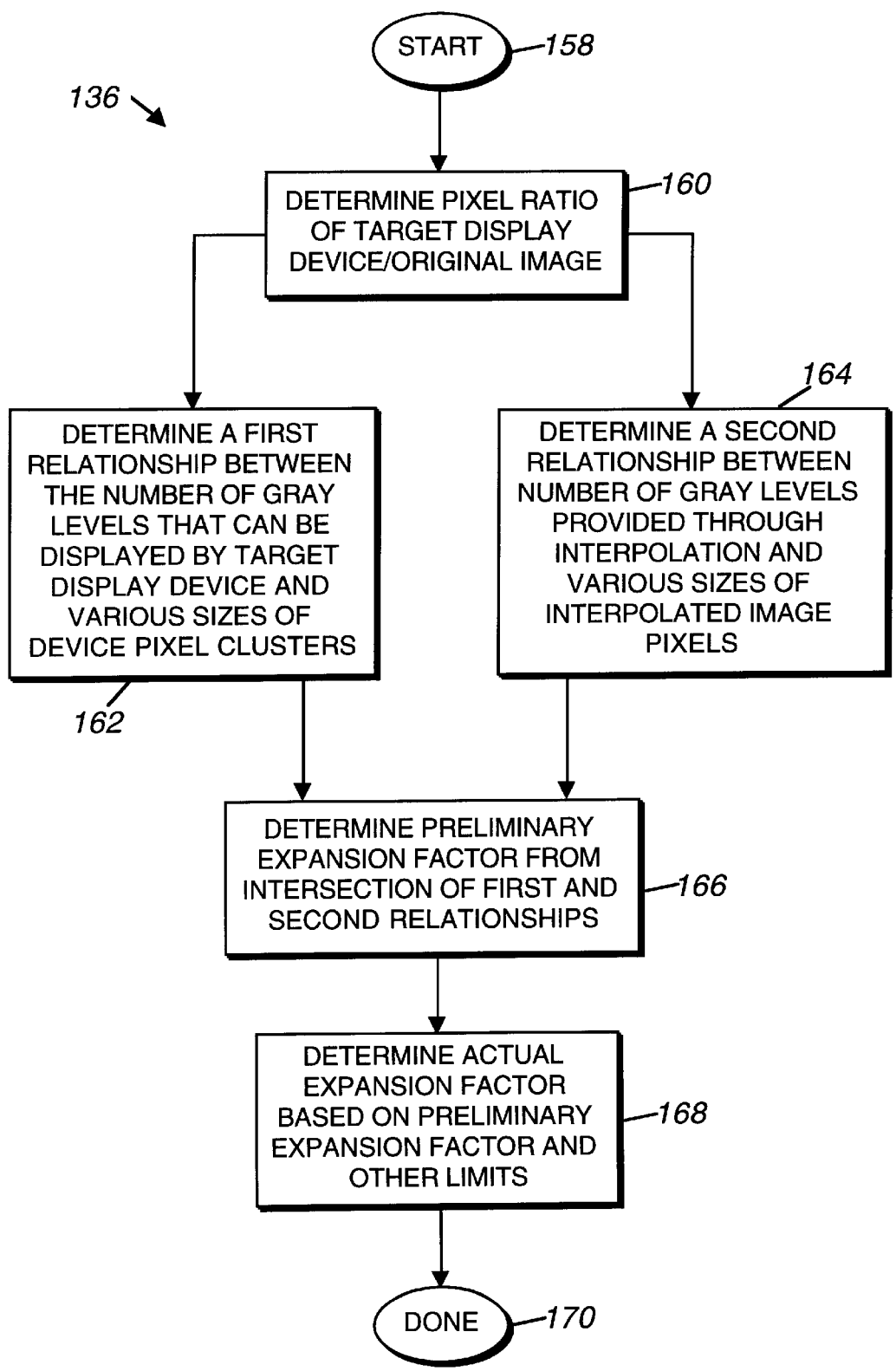
FIG. 7 is a flow diagram illustrating the step of FIG. 6 for determining an expansion factor according to the present invention.

FIG. 7 is a flow diagram illustrating step 136 of FIG. 6 in which an actual expansion factor is determined from the gray levels of the target display device and the gray levels of possible interpolated images. Preferably, step 136 is performed for both x- and y-directions. The process begins at 158, and, in step 160, the pixel resolution ratio between the target display device and the original image is determined. This ratio can be determined a number of different ways. For example, the most common method is to determine a resolution of the target display device, which can be obtained, for example, by querying for hardware information from the target display device or digital computer 101. The resolution of the original image is also determined by well known methods, such as from a header in the original image file or by determining the memory size of the original image. Typically, the original image resolution is expressed in pixels per inch (or other unit measurement) and the target display device resolution is expressed in dots per inch (dpi) (for a printing device) or pixels per inch (for a display screen device). Other units of measurement can also be used. Alternatively, the ratio between target device resolution and original image resolution can be determined in different ways. For example, the step 136 can be provided with the desired ratio directly rather than as two separate resolution measures.

Steps 162 and 164 can be performed in parallel or substantially in parallel by microprocessor 114 (or multiple microprocessors) (e.g., using multitasking). The two arrows leading from step 160 are provided to indicate this parallel process. Alternatively, steps 162 and 164 can be performed sequentially, with either step being performed before the other. For example, step 162 can be performed prior to, or after, receiving an original image in step 134 of FIG. 6, while step 164 can be performed after receiving the original image. Also, one or more steps of process 136 can be performed on different computer systems.

In step 162, the process determines a relationship between the number of gray levels that can be displayed by the target display device and various sizes of device pixel clusters. This relationship can be expressed as an analytical equation, or can be expressed as a number of discrete data values for different gray levels and pixel cluster sizes. Two different methods of providing this relationship are described subsequently.

A "pixel cluster", as referred to herein, is a group of pixels displayed by the target display device, typically arranged in a square, having N target device pixels per side of the square and having $N^2$ pixels in the cluster. A number of the $N^2$ pixels in the cluster are dark (e.g., black) while the other pixels in the cluster are light (e.g., white). By turning on different numbers of pixels, different gray levels can be simulated in the process known as "dithering." A number of the pixel clusters are positioned and displayed adjacent to each other to portray a gray level. The number of gray levels L that can be portrayed by a cluster of $N^2$ pixels is expressed as $L=N^2+1$ (for a bi-level output display device). The number of gray levels L that can be displayed by the target display device thus depends on the size of the pixel cluster. For example, there are 10 possible gray levels of a cluster having N=3, or 9 total pixels: 1) zero pixels dark, 2) one pixel dark, 3) two pixels dark, etc., up to 10) all 9 pixels dark. Similarly, a N=4 cluster will allow the target device to display 42+1=17 gray levels, and a N=16 cluster will allow the target device to display 257 gray levels. The positional arrangement of the dark and light pixels within the cluster is well known to those skilled in the art and is not addressed here for reasons of simplicity of explanation, but can affect the appearance and smoothness of the gray levels and, to a less degree, the appearance and smoothness of the image.

Another factor that determines the number of gray levels that can be displayed by the target display device is the number of gray levels that can be displayed for one pixel by the target device. In a bi-level (halftone) device, only one of two possible gray levels can be displayed per pixel: black or white. Other devices can display additional gray levels (e.g., colors, shades of gray, etc.) for each pixel. For example, an 8-bits/pixel device can display one of 256 possible colors for each pixel. Taking the number of gray levels per pixel into account, the number of gray levels L at various pixel cluster sizes can then be expressed more generally as $$L=(G-1)N^2+1 \tag{1}$$

where G is the number of possible gray levels that can be displayed per pixel. G=2 for a bi-level device, and is a greater value for other devices.

Figure 8:
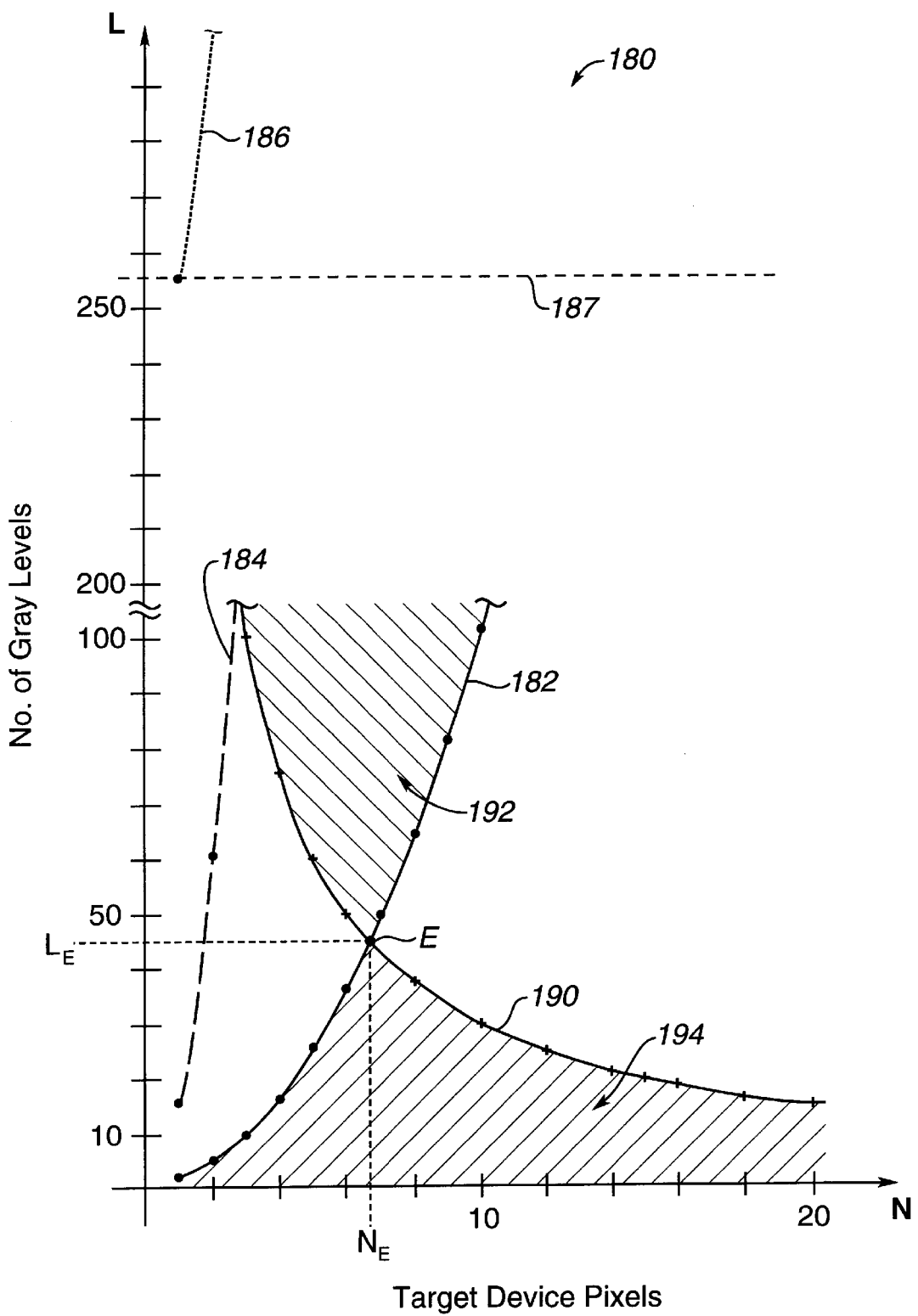
FIG. 8 is a graph illustrating finding an expansion factor according to the method of FIG. 7.

The relationship between the number of gray levels that can be displayed by the target device and various sizes of device pixel clusters can be portrayed as a graph 180 as shown in FIG. 8. The vertical axis represents the number of gray levels displayable, and the horizontal axis represents the size of the device pixel cluster. Curve 182 is a parabolic relationship $(G-1)N^2 +1$, showing the different gray levels displayable at different cluster sizes for a bi-level display device (G=2). Thus, for example, 2 gray levels can be displayed for a pixel cluster size of 1, 5 gray levels can be displayed for a pixel cluster size of 2, 50 gray levels can be displayed for a cluster size of 7, etc. Curve 184 (dotted line) represents the same relationship for an output display device able to display 16 gray levels per pixel (G=16). Curve 184 has a much greater rate of increase than curve 182. Curve 186 shows a similar curve for a display device that can display 256 gray levels per pixel (G=256), and has an even greater rate of increase. The horizontal line 187 represents a limit to the number of gray levels that can be represented in an image (e.g., in PostScript) or due to other limitations of the target display device or connections from the computer system 101 to the target display device. For example, images used in some PostScript interpreter implementations use 8-bit pixel representations and thus are limited to 256 gray levels per pixel. In some embodiments, the peripheral bus 20 (see FIG. 1) may only be able to transfer a certain amount of data at once, which can limit the number of gray levels that can be displayed by the target display device. In other embodiments, other limits may be imposed.

Step 164 is also performed after step 160. In step 164, the process determines a second relationship between the maximum number of gray levels provided through interpolation in an interpolated image (i.e. in possible interpolated images) and various sizes of interpolated image pixels. Like the relationship of step 162, the second relationship can be provided as an analytical equation or as a number of datapoints determined numerically, as explained subsequently. This second relationship depends on the target device resolution, the resolution of the original image, and various sizes of the interpolated image pixels, where the sizes of the interpolated image pixels are expressed in terms of target device pixels. Generally, the number of gray levels displayed in the interpolated image is inversely proportional to the size of the interpolated image pixel. This relationship occurs because the greater the pixel size, the less interpolated image pixels can fit between the original pixels. Consequently, the number of gray levels in the interpolated image is reduced.

The second relationship is shown as curve 190 in graph 180 of FIG. 8. The curve is represented by the equation:

$$L = \frac{D/I}{N} + 1, L \geq 2 \qquad (2)$$

where L is the number of gray levels, D is the target device resolution, I is the resolution of the original image, and N is the interpolated image pixel size expressed in units of target device pixels. Thus, curve 190 starts (at the left) at a high value on the vertical axis for small-sized interpolated image pixels, and ends at a low number of gray levels for large interpolated image pixels. A different curve would be provided for each ratio of target device resolution to original image resolution, i.e., curve 190 would be positioned at different coordinates depending on the target device and original image resolutions. For example, curve 190 shown in FIG. 8 is an example of gray levels for an image that has been interpolated from an original image having a resolution of 1 pixel per inch for a target device having a resolution of 300 d.p.i. Thus, equation (#) would yield L=(300/1)/N+1= 300/N+1. A different original image resolution and/or target device resolution would cause the curve 190 to be positioned and look differently. Curve 190 is limited in gray levels to L=2 at its rightmost point on graph 180 and is not limited in theory at the left end of the graph; practically, however, curve 190 can be limited at the left part of graph 180 by a limit such as the L=256 limit (line 187) in current PostScript implementations.

Figure 4A:
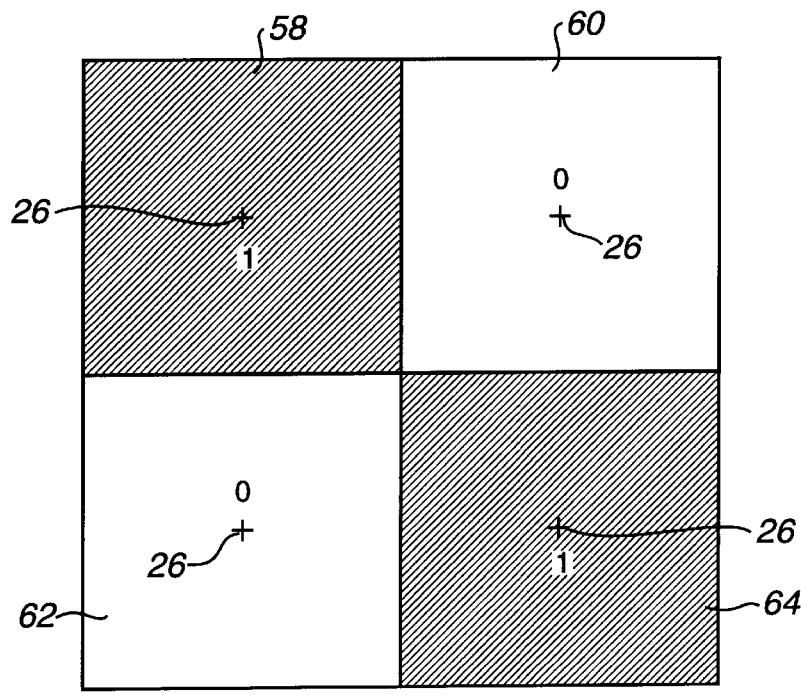
FIGS. 4a and 4b are diagrammatic illustrations of original image and an interpolated image that has been interpolated in two dimensions.
Figure 4B:
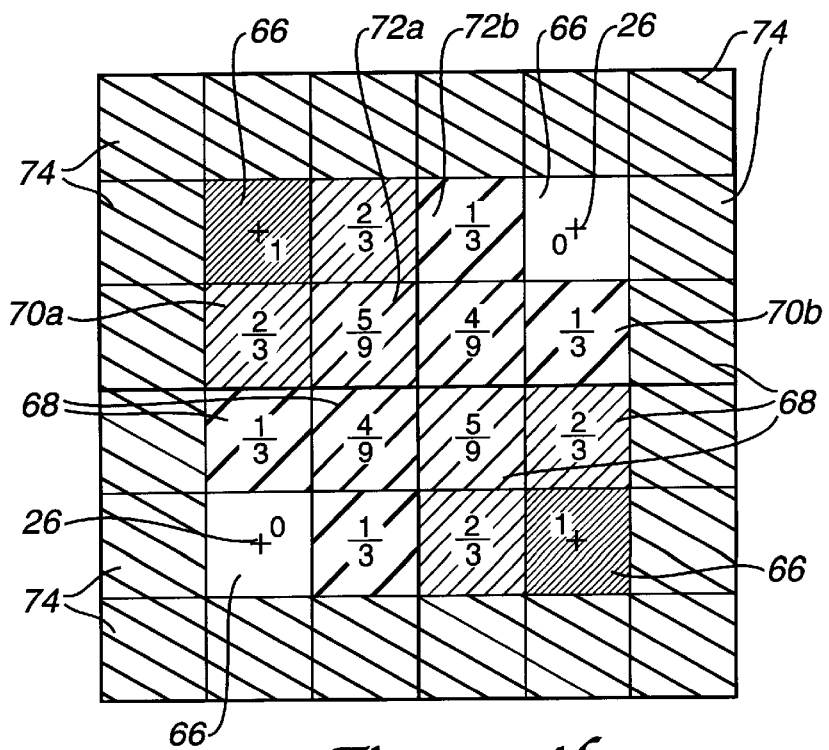

Step 166 follows steps 162 and 164. In step 166, the process determines a preliminary expansion factor from the intersection of the first relationship with the second relationship. This expansion factor is known as a "preliminary" expansion factor since the result of step 166 may not be the desired expansion factor due to other factors, described below with reference to step 168. As shown in graph 180 of FIG. 8, the curve 182 intersects with curve 190 at a point E. Point E represents the pixel cluster size, interpolated image pixel size and the most number of gray levels in the interpolation process without exceeding the number of gray levels that the target device can represent. The preliminary expansion factor is equal to the number of gray levels $L_E$ in the interpolated image (on curve 190) at point E, minus 1 (for both bi-level and multi-level devices). For example, if a interpolated image has three times the resolution of an original image (expansion factor of 3), then 4 gray levels are displayed, as shown in the example of FIG. 4a and 4b (number of gray levels=expansion factor+1).

The preliminary expansion factor is thus determined in view of both the number of gray levels displayable on a target display device (curve 182) and the number of gray levels that can be represented in possible interpolated images (curve 190). Previous methods might inefficiently limit the expansion factor to where curve 190 intersects limit line 187 or intersects the N=1 axis.

Point E can be generally obtained using two methods, described herein (other methods can also be used). Both methods achieve the same result using an analytical method assuming that both curves are monotonic (as is generally the case), but may obtain a slightly different result using a numerical method (described subsequently). The preferred first method is to choose the smallest number of gray levels of those gray levels that are greater than or equal to the number of gray levels that can be displayed by the target output device and which are greater than or equal to the number of gray levels in the interpolated image, i.e., the minimum number of gray levels of those gray levels above (or equal to) both curves 182 and 190 (indicated by shaded area 192). Point E in graph 180 is the minimum point of area 192. Thus, the preliminary expansion factor can be expressed as follows:

$$Exp = MIN[MAX(f(N), g(N))] \qquad (3)$$

where f(N) is the function (curve) 182 (or 184 or 186) representing the number of grays vs. the size of the pixel cluster on the target display device, g(N) is the function (curve) 190 representing the number of grays vs. the size of the pixel in the interpolated image (in units of device pixels), and "Exp" is the preliminary expansion factor. The MAX function finds the maximum number of gray levels for the two functions for all N, and the MIN function finds the minimum number of gray levels within the MAX region. In non-exact implementations, this method tends to find expansion factors that are slightly above point E shown in graph 180. This is desirable in most computer systems, such as PostScript, in which the target device can render various sized pixel clusters, i.e., it is better to err having slightly more gray levels than can be displayed by the target device, since the extra gray levels will not cause a loss of displayed gray levels viewed by a person.

The second method is an alternative method that can be used instead of the first method. The second method is to choose the largest number of gray levels of those gray levels that can be displayed by the target output device and which can be included in the interpolated image. This is equivalent to taking the minimum area of the two curves 182 and 190 (i.e. the area under both curves 182 and 190 ) and find the maximum point of that minimum area. The shaded minimum area 194 beneath the two curves 182 and 190 represents all the gray levels which can be represented on the target output device and which can be included in the interpolated image. Point E is the maximum number of gray levels within this minimum area. The preliminary expansion factor can be expressed thus:

$$Exp = MAX[MIN(f(N), g(N))] \qquad (4)$$

where f(N) is the curve 182 (or 184 or 186 ) representing the number of grays vs. the size of the pixel cluster on the target display device, and g(N) is the curve 190 representing the number of grays vs. the size of the pixel in the interpolated image. The MIN function finds the minimum number of gray levels for the two functions for all N (number of device pixels), and the MAX function finds the maximum point within that minimum number of gray levels. This method tends to find expansion factors slightly below point E shown in graph 180. Since it is generally more desirable to have slightly more gray levels than needed rather than less, the second method is not as useful as the first method but may be used, for example, in computer systems/output devices that provide images using a fixed pixel cluster size set to the size of an image pixel. Alternatively, the method and apparatus described herein can evaluate whether to use the first method or the second method based on other criteria when interpolating an image, such as hardware/software characteristics, user preferences, etc. The more efficient or desired method would then be selected and used to find the preliminary expansion factor.

A different way to describe the methods of the present invention for finding the preliminary expansion factor is as follows: increase the original image resolution until the area represented by an interpolated pixel in target device space has become so small that the target device has too few device pixels to represent the additional gray levels introduced by further interpolation. The increasing of the original image resolution is a movement on curve 190 from the right to the left, until point E is reached, above which the target display device can no longer represent additional gray levels.

In step 168, the process determines the actual expansion factor based on the preliminary expansion factor and other limits. The other limits can include the maximum number of gray levels that can be displayed due to page description language or number of bits (as explained above) to hardware limitations, to user-imposed limitations, or to other limitations imposed by the system, such as the prior art limitations of D/I (target device resolution divided by original image resolution), the rule of thumb multiplier of 2, etc. For example, if the preliminary expansion factor calculated in step 166 corresponds to a number of gray levels in excess of the 256 gray level limit that may be imposed by a particular display language, then the expansion factor can be adjusted to the maximum expansion factor that will not exceed the limit.

In addition, other adjustments to the expansion factor are preferably made. If the determined expansion factor is a non-integer, it is preferably rounded the nearest integer. This allows the interpolated image to fully maintain the boundary of the original image.

Another preferred adjustment is to adjust the expansion factor to an odd number. For example, in the first method of step 166, the expansion factor can be increased to the nearest odd number; using the second method, the expansion factor can be decreased to the nearest odd number. This adjustment advantageously minimizes the amount of aliasing effects in the interpolated image that would occur if an even expansion factor were used, as explained in greater detail with respect to FIGS. 9a–9d. After such adjustments (if any), the resulting expansion factor is known as the "actual" expansion factor. This is the expansion factor to be used in the interpolation step 138 of FIG. 6. The process 136 is complete at 170 after the actual expansion factor is determined in step 168.

Figure 9A:
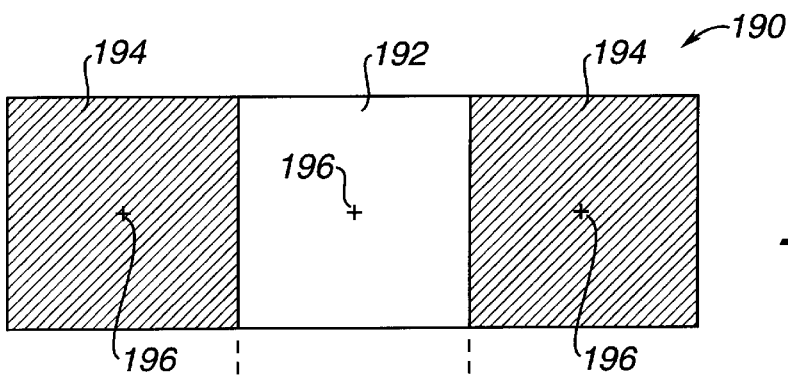
FIGS. 9a–9d are diagrammatic illustrations of using even and odd expansion factors to interpolate an image.
Figure 9B:
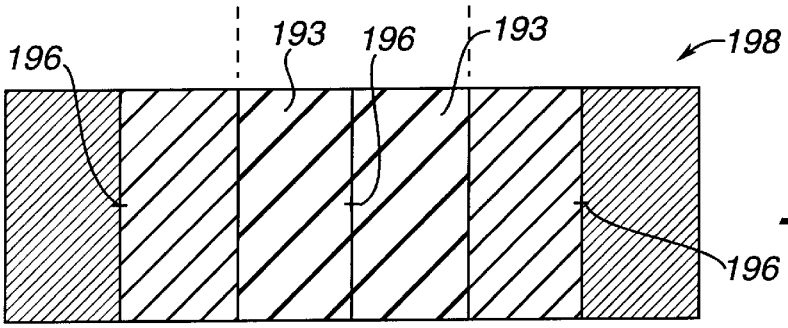

FIGS. 9a–9d demonstrate the differences of using odd and even expansion factors pertaining to step 168 of FIG. 7. FIG. 9a shows three original image pixels 190 having only two possible gray levels, where a light pixel 192 is positioned in between two dark pixels 194. FIG. 9b illustrates one method of interpolating the original pixels 190 in one dimension using an even expansion factor (an expansion factor of 2). The centers of the original pixels 190 are postioned at the borders of the interpolated pixels 198. As shown, this can cause aliasing problems due to some original gray levels being eliminated. In the example of FIG. 9b, the original light pixel 192 has been removed to accommodate the intermediate gray levels of pixels 193. The loss of original gray levels can cause the interpolated image to appear differently from the original image. In some cases, additional anti-aliasing processing may have to be performed.

Figure 9C:
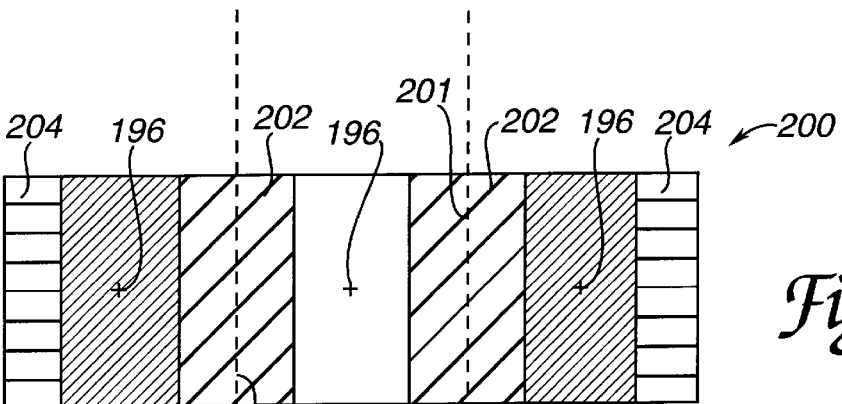

FIG. 9c shows a different example of one dimensional interpolation using an even expansion factor (2). Here, the interpolated pixels 200 have been centered at the centers 196 of the original pixels. However, this causes other intermediate interpolated pixels 202 to be positioned across the boundaries 201 of the original pixels. This can cause the interpolated image to only approximately fill the area covered by the original image, since border areas 204 are only half-width areas that cannot be filled with pixels. This also causes image markings and appearance of the interpolated image to only approximately match the original image, since the interpolated pixel borders are different from the original pixel borders.

Figure 9D:
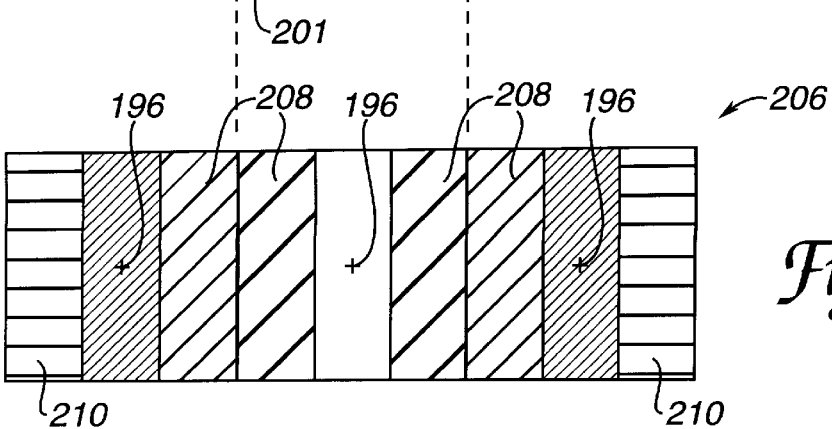

FIG. 9d shows an example of interpolation in one dimension using an odd expansion factor (an expansion factor of 3). Here, interpolated pixels 206 can be centered at the centers 196 of the original pixels, and the intermediate interpolated pixels 208 have borders positioned at the same locations as the borders of the original pixels. This allows the borders and appearance of the original image to be matched exactly with no aliasing effects. Border areas 210 are full-sized pixels which are typically assigned a gray level either determined by the next adjacent pixel (not shown) or by a default gray level.

EXAMPLE OF ANALYTICAL METHOD

The following example uses an analytical method to solve for the preliminary expansion factor in the process 136 of FIG. 7. Assuming that an original image has a resolution of 10 pixels/inch and that the target display device has a resolution of 600 d.p.i., the ratio D/I of step 160 is 600/10= 60. In step 162, the first relationship between the number of gray levels that can be displayed by the target display device and pixel cluster sizes is determined. This can be expressed as the following equation, assuming a bi-level target device:

$$L=(G-1)N^2+1 \to L=N^2+1 \tag{5}$$

where L is the number of gray levels, N is the target device pixel cluster size, G is the number of gray levels that can be displayed per pixel, and D/I is the ratio of target device resolution to original image resolution. This equation can be used whether the target display device is a bi-level or multi-level (contone, etc.) device.

In step 164, the second relationship between the number of gray levels provided through interpolation and the interpolated image pixel sizes is determined. This relationship can be expressed as the following equation:

$$L = \frac{D/I}{N} + 1 = \frac{60}{N} + 1 \tag{6}$$

where, again, L is the number of gray levels in the interpolated image, and N is the size of a pixel of the interpolated image (expressed in terms of target device pixels).

In step 166, the intersection of the two relationships is determined. In this analytical method, this can be accomplished by setting equations (5) and (6) equal to each other, as shown below:

$$\frac{D/I}{N} + 1 = N^2 + 1$$

$$N = \sqrt[3]{D/I}$$

$$N = \sqrt[3]{60} = 3.91$$

Thus, the intersection point E, as shown in FIG. 8, occurs at N=3.91≅4. The preliminary expansion factor is equal to the number of gray levels of the interpolated image at the computed N, minus 1. The number of gray levels minus 1 equals (D/I)/N+1−1, so that the preliminary expansion factor equals (D/I)/N=(D/I)$^{2/3}$=60/3.91=15.33≅15. The expansion factor is preferably rounded up to the nearest integer when a fraction value results (and rounded to an odd number). The actual expansion factor is then determined in step 168 taking into account other limits that may also be provided.

EXAMPLE OF NUMERICAL METHOD

The following example uses a numerical method to solve for the preliminary expansion factor in the process 136 of FIG. 7. This method is more likely to be used when the gray levels that the target device can display are not easily represented in analytical form. Assuming that an original image has a resolution of 3 pixels/inch and that the target display device has a resolution of 600 d.p.i. and is a halftone (bi-level) device such as a laser printer, the ratio D/I of step 160 is 600/3=200. In step 162, the first relationship between the number of gray levels that can be displayed by the target display device and pixel cluster sizes is determined. This can again be expressed as equation (1) or (5) in the analytical example provided above. Preferably, in the numerical method, this relationship between the number of gray levels and the pixel cluster size for a target display device is provided as values in a look-up table that can be stored in RAM 16, ROM 18, or a different storage device. These values, for example, could have been determined experimentally at an earlier time. For example, the manufacturer of the target display device might determine the number of gray levels displayable by the target device for different pixel cluster sizes and provide the look up table in the memory of the target display device. The table can be transferred to computer system 101 when the original image is interpolated. An example of such a table is provided below as Table 1 (typically, more values would be calculated for additional pixel cluster sizes in an actual implementation):

TABLE 1

| target device pixel cluster size (N) | # of gray levels possible for target device (L) |
|---|---|
| 2 | 5 |
| 4 | 25 |
| 8 | 64 |
| 16 | 180 |

Tables such as Table 1 can include as many values as needed for the desired accuracy of the expansion factor.

In step 164, the second relationship between the number of gray levels possible in the interpolated image and the interpolated image pixel size is determined. This relationship can be calculated by using equation (2) or (6) provided in the analytical method. The L values determined for this example are shown in Table 2:

TABLE 2

| intemolated image pixel size (N) | # of gray levels in interpolated image |
|---|---|
| 2 | 101 |
| 4 | 51 |
| 8 | 26 |
| 16 | 14 |

In step 166 of FIG. 7, the first method of finding the intersection point of the two relationships of steps 162 and 164 determines the minimum number of gray levels for the maximum area above the 2 curves of FIG. 8. Table 3 summarizes this step:

TABLE 3

| N | # of gray levels possible for target device | # of gray levels in interpolated image | Maximum |
|---|---|---|---|
| 2 | 5 | 101 | 101 |
| 4 | 25 | 51 | 51 |
| 8 | 64 | 26 | 64 |
| 16 | 180 | 14 | 180 |

The maximum column shows the maximum value between the target device gray levels and the interpolated image gray levels (if one is subtracted from these maximum values, these are expansion factors). The process selects the minimum value in the maximum column, which is 51, and this is (approximate) the gray level number at intersection point. The preliminary expansion factor is thus 51−1=50. If each number in the maximum column has a value of one subtracted, this step can also be described as selecting the minimum expansion factor from the multiple expansion factors in the maximum column.

The alternate second method of step 166 finds the intersection by finding the minimum number of gray levels for the two relationships, and finding the maximum of those minimum numbers. Table 4 below summarizes this step:

TABLE 4

| N | # of gray levels possible for target device | # of gray levels in interpolated image | Minimum |
|---|---|---|---|
| 2 | 5 | 101 | 5 |
| 4 | 25 | 51 | 25 |
| 8 | 64 | 26 | 26 |
| 16 | 180 | 14 | 14 |

The maximum value of the minimum gray levels is 26, and this is the (approximate) gray levels at the intersection point. The preliminary expansion factor is 26−1=25. As above, if it is subtracted from the values in the minimum column, this step can be described as selecting the maximum expansion factor of the multiple expansion factors shown in the minimum column. Thus, the first and second methods yield slightly different results, one result above the exact intersection point, and the other result below the exact intersection point. Other methods can be used to find a value closer to the exact intersection point, using the data calculated from both methods, if desired.

The preliminary expansion factor can be limited in step 168. One preferred is to check if the expansion factor is greater than D/I; it is not in the numerical example (if it were, the expansion factor would be reduced to D/I). In the numerical method, a gray level limit of 256 can be included in the above look-up table that is previously calculated for the target device. In addition, adjustments such as moving the expansion factor to an odd number can be implemented.

Other methods for determining an intersection of two curves, or for determining a maximum value of a minimum curve that is the result of two curves, can be implemented in other embodiments.

The method of the present invention determines an expansion factor to provide efficient and high quality interpolated images. The expansion factor can be precisely determined instead of having to rely on a rule of thumb or other approximate method, leading to interpolated images that do not sacrifice image storage efficiency for visual quality.

While this invention has been described in terms of several preferred embodiments, it is contemplated that alterations, modifications and permutations thereof will become apparent to those skilled in the art upon a reading of the specification and study of the drawings. For example, the interpolated images described herein can be provided to a specific target display device, or may be provided to a different output display device or stored by a storage device. In addition, the expansion factor described herein can be used to interpolate in one or more dimensions of the original image and create a higher resolution image. The interpolation method described herein can also be used on asymmetrical images, in which the resolution of an image in one dimension is different from the resolution of the image in another dimension.

Furthermore, certain terminology has been used for the purposes of descriptive clarity, and not to limit the present invention. It is therefore intended that the following appended claims include all such alterations, modifications and permutations as fall within the true spirit and scope of the present invention.

What is claimed is:

1. A method for producing an interpolated image from an original image comprising the steps of:

providing on a computer system an original image having a spacial resolution;

determining on the computer system an expansion factor for the original image, the expansion factor being (1) the multiplier by which the spacial resolution of the original image will be increased; and (2) derived from both a number of gray levels displayable on a target display device and a number of gray levels in possible interpolated images that can be produced from the original image; and interpolating the original image utilizing the expansion factor to produce an interpolated image, the interpolated image including a greater spacial resolution than the original image and a greater number of gray levels than the original image, the interpolation being implemented on at least one computer system.

2. A method as recited in claim 1 further comprising a step of providing the interpolated image to an output display device.

3. A method as recited in claim 2 wherein said output display device is the target display device.

4. A method as recited in claim 3 further comprising a step of determining a ratio of target display device resolution to the resolution of the original image and using the ratio in the determination of the expansion factor.

5. A method as recited in claim 4 wherein the number of gray levels displayable on the target display device is expressed as a first relationship between the number of gray levels displayed and the size of a pixel cluster displayed by the target display device.

6. A method as recited in claim 5 wherein the number of gray levels in possible interpolated images is expressed as a second relationship between the number of gray levels in a particular interpolated image and a size of a pixel in the interpolated image.

7. A method as recited in claim 6 wherein the second relationship is determined using the ratio of the target device resolution to the original image.

8. A method as recited in claim 6 wherein the expansion factor is determined by the step of finding an intersection between the first relationship and the second relationship.

9. A method as recited in claim 8 wherein the expansion factor resulting from the step of finding an intersection is a preliminary expansion factor, and further comprising a step of adjusting the preliminary expansion factor to an odd integer to provide an actual expansion factor which is used in the interpolating step.

10. A method as recited in claim 8 wherein the expansion factor is determined using an analytical method of finding said intersection of said two relationships.

11. A method as recited in claim 8 wherein said expansion factor is determined using a numerical method of finding said intersection of said two relationships.

12. A method as recited in claim 11 wherein the expansion factor resulting from the step of finding an intersection is a primary expansion factor, and further comprising the step of applying additional limits to the preliminary expansion factor to determine an actual expansion factor which is used in the interpolating step.

13. A method as recited in claim 3 wherein said interpolation is performed in one dimension of the original image.

14. A method as recited in claim 3 wherein the target display device is a halftone display device.

15. A method as recited in claim 3 wherein the target display device is a multi-level display device that can display one of a plurality of gray levels for each pixel displayed.

16. An efficient method for displaying an image on a high resolution output display device comprising the steps of:

determining the resolution of an original incoming image;

determining the resolution of the output display device;

determining the number of gray levels that the output display device can represent at a plurality of pixel cluster sizes;

determining a plurality of expansion factors from the original image resolution and the resolution of the output display device for each of the plurality of pixel cluster sizes;

selecting an expansion factor from the plurality of expansion factors which is the smallest expansion factor of the ones of the plurality of expansion factors which are larger than the number of gray levels that the output display device can represent at the pixel cluster size which corresponds to the selected expansion factor;

using the selected expansion factor to create an interpolated image whose resolution is the incoming image resolution times the selected expansion factor;

filling the interpolated image with interpolated gray values that are derived from the incoming image; and displaying the interpolated image on the output display device.

17. An efficient method as recited in claim 16 wherein the step of determining the number of gray levels that the output display device can represent includes consulting a look-up table of gray level values and pixel cluster values.

18. An efficient method as recited in claim 16 wherein the step of determining a plurality of expansion factors includes determining the number of gray levels in possible interpolated images at various interpolated image pixels sizes that are equal to device pixel sizes, utilizing the resolution of the original incoming image and the resolution output display device.

19. An efficient method as recited in claim 18 wherein the selected expansion factor is further limited, if necessary, to a value under the output display device resolution divided by the original image resolution.

20. An efficient method as recited in claim 16 wherein the output display device includes one of a display screen and a printing device.

21. A method for displaying an image on a display device, the method comprising the steps of:
  determining a ratio between a display resolution of a target display device and a resolution of an original image received by a computer system;
  determining a first relationship between the number of gray levels that can be displayed by the target display device and a size of pixel clusters implemented by the target display device;
  determining a second relationship between the number of gray levels in an interpolated image derived from the original image and a size of an interpolated pixel, where an interpolated pixel size is equal to the target device pixel cluster size;
  finding an intersection of the first relationship and the second relationship to determine an expansion factor;
  interpolating the original image utilizing the expansion factor to produce an interpolated image that has a greater resolution and a greater number of gray levels that the original image; and
  supplying the interpolated image to an output display device to be displayed.

22. A method as recited in claim 21 wherein the output display device is the target display device.

23. A method as recited in claim 22 wherein the expansion factor resulting from the step of finding an intersection is a preliminary expansion factor, and further comprising a step of applying additional limits to the preliminary expansion factor to determine an actual expansion factor which is used in the interpolating step.

24. A method as recited in claim 21 wherein the expansion factor is determined from the intersection by determining a number of gray levels at the intersection and deriving the expansion factor from the number of gray levels.

25. A method as recited in claim 21 wherein the step of utilizing the expansion factor includes multiplying the resolution of said original image by the expansion factor to determine a resolution of the interpolated image.

26. A method as recited in claim 25 wherein the step of finding an intersection of the first relationship and the second relationship includes finding where the first relationship is equal to the second relationship.

27. A method as recited in claim 26 wherein the step of finding an intersection of the first relationship and the second relationship includes utilizing an analytical method to find the intersection.

28. A method as recited in claim 25 wherein the step of finding an intersection includes finding the smallest number of gray levels of those gray levels that are larger than the number of gray levels that can be displayed by the target display device and are larger than the number of gray levels that can be included in the interpolated image.

29. A method as recited in claim 25 wherein the original image is interpolated in one dimension by multiplying the expansion factor by the resolution of the original image in one dimension of the original image.

30. A method as recited in claim 25 wherein the original image is interpolated in two dimensions by multiplying the expansion factor by the resolution of the original image in two dimensions of the original image.

31. A computer system for producing an interpolated image from an original image, the computer system comprising:
  a processor;
  read/write memory coupled to the processor;
  a target display device coupled to the processor for displaying images;
  means for receiving an original image on the computer system, the original image having a resolution;
  means for determining on the computer system an expansion factor for the original image, the expansion factor being (1) the multiplier by which the spacial resolution of the original image will be increased; and (2) derived from a number of gray levels displayable on a target display device and a number of gray levels in possible interpolated images that can be produced from the original image; and
  means for interpolating the original image utilizing the expansion factor to produce an interpolated image, the interpolated image having a greater resolution than the original image and a greater number of gray levels than the original image, the original image, the interpolation being implemented on the computer system and being supplied to the target display device for display.

32. A computer system as recited in claim 31 wherein the target display device is a halftone display device.

33. A computer system as recited in claim 31 wherein the target display device is able to display more than two possible gray levels for each pixel displayed.

34. A computer system as recited in claim 31 wherein the number of gray levels displayable on the target display device is expressed as a relationship between the number of gray levels displayed and the size of a pixel cluster displayed by the target display device.

35. A computer system as recited in claim 34 wherein the number of gray levels in possible interpolated images is expressed as a second relationship between the number of gray levels in a particular interpolated image and the size of a pixel in the particular interpolated image.

36. A computer system as recited in claim 35 wherein the means for determining the expansion factor includes means for finding an intersection between the first relationship and the second relationship, and means for determining the expansion factor from a number of gray levels at the intersection.

37. A computer system as recited in claim 31 further comprising means for finding an actual expansion factor derived from the expansion factor utilizing additional limits imposed by the target display device.

38. A method for interpolating an image, the method comprising the steps of:
  receiving an original image having a resolution;
  determining an expansion factor limited by a resolution of a target display device, the expansion factor being the multiplier by which the spacial resolution of the original image will be increased;
  adjusting the expansion factor to an odd integer;

creating an interpolated image using the adjusted expansion factor, the interpolated image having a resolution greater than the resolution of the original image; and displaying the interpolated image on an output display device.

39. A method as recited in claim 38 wherein the expansion factor is derived from a number of gray levels displayable on the output display device and a number of gray levels in an interpolated image than can be produced from the original image.

40. A method as recited in claim 39 wherein the step of determining an expansion factor includes:

determining a first relationship between the number of gray levels that can be displayed by the output device and a size of pixel clusters implemented by the output display device;

determining a second relationship between the number of gray levels in an interpolated image derived from the original image and the size of pixel clusters implemented by the output display device; and finding an intersection of the first relationship and the second relationship to determine the expansion factor.

* * * * *